Patented Apr. 29, 1941

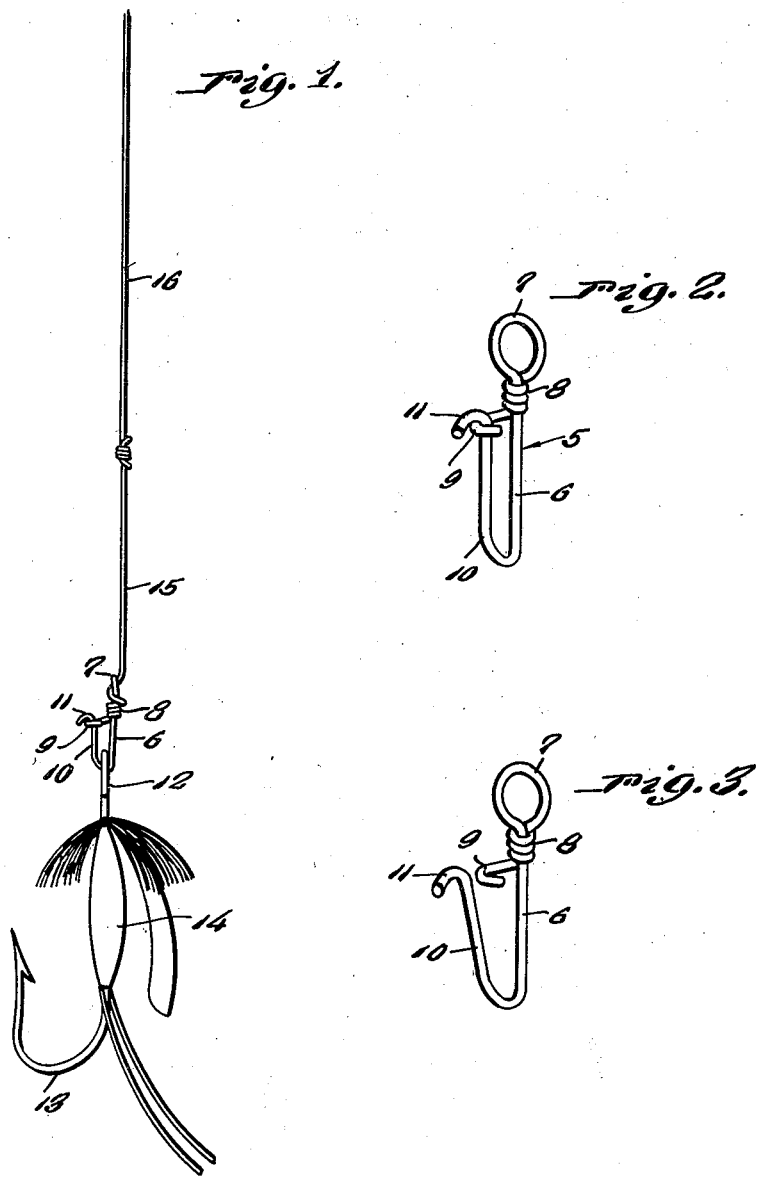

2,240,235

UNITED STATES PATENT OFFICE 2,240,235

UTILITY HOOK FOR FISHERMEN

Martin Whan, McCloud, Calif.

Application July 8, 1940, Serial No. 344,424

1 Claim. (Cl. 24—237)

This invention is a device, in the form of a hook or clasp, particularly designed for use by fishermen to facilitate attaching a fishhook, or a fish lure to the line, and the device will be found to be of value to fly fishermen and to fishermen in general.

In fishing it is necessary at times either to change the hook, or the lure, and particularly trout fishermen, when using expensive tapered leaders, are required to change flies or lures repeatedly in order to find out which fly or lure the fish will take. This consumes a lot of time and necessitates the cutting and re-cutting of the leader as well as the tying and re-tying of the same. However, with a device as contemplated by the present invention, this cutting and/or re-cutting of the leader, and the tying and re-tying of the same is obviated and the change over from one type of hook or lure to another type of hook or lure can be quickly and efficiently effected.

The invention, together with its objects and advantages, will be best understood from a study of the following description taken in connection with the accompanying drawing wherein:

Figure 1 is an elevational view illustrating the application of the invention.

Figure 2 is a perspective view of the hook in closed condition, and

Figure 3 is a view similar to Figure 2 with the hook in open position.

Referring more in detail to the drawing it will be seen that in the preferred embodiment thereof the device, indicated generally by the reference numeral 5, is formed from a single length of suitable material, preferably light steel wire, such as piano wire dimensioned, bent and shaped to provide a shank 6 that at its upper end is first bent into the form of an eye 7 and is then coiled around the shank 6 as at 8, and then extended laterally and bent so as to form a hook-shaped keeper 9.

Remote from the eye 7 the shank 6 is bent on itself and projected upwardly so as to provide a bill 10 for the hook and due to the inherent tendency of the wire tends to spring outwardly away from the shank 6.

At its free end the bill 10 merges into a latch hook 11 that is adapted to be sprung into engagement with the keeper 9 for substantially closing the hook 6 and thereby retain the hook in positive engagement with the eye 12 of the fishhook 13, and through which eye 12 the bill 10 of the hook 5 is trained for detachably connecting the hook 13 with the device 5.

As shown in Figure 1 the fishhook 13, as therein illustrated, forms part of a conventional fish lure 14.

The eye 7 of the device 5 is connected in any convenient manner to the leader 15 of the fish-line 16 as shown in Figure 1.

It will also be understood that the device 5 is made in different sizes and of light or heavy wire to receive hooks of corresponding sizes and weight.

It will also be appreciated that the application of a hook 13, or the removal of a hook or fish lure from the device can be accomplished within a very short time and without requiring any appreciable amount of skill on the part of the fisherman.

It is thought that a clear understanding of the manner of use, utility and advantages of a device embodying the features of the present invention will be had without a more detailed description thereof.

Having thus described the invention what is claimed as new is:

A device for connecting a fish hook or lure to a line, said device being formed of a single piece of wire and comprising a U-shaped part, one limb of which forms a shank and the other limb a bill with the shank longer than the bill, an outwardly extending hook at the upper end of the bill, an eye formed at the upper end of the shank, a short twisted part on the upper end of the shank immediately below the eye and a right angular straight part extending toward the hook end of the bill at the lower end of the twisted part and having a hook at its free end for receiving the hooked part of the bill when the device is closed.

MARTIN WHAN.